(12) United States Patent
Zhang et al.

(10) Patent No.: US 10,264,603 B2
(45) Date of Patent: Apr. 16, 2019

(54) COORDINATION METHOD BETWEEN ACCESS POINTS USING UNLICENSED FREQUENCY BAND

(71) Applicant: SHANGHAI RESEARCH CENTER FOR WIRELESS COMMUNICATIONS, Shanghai (CN)

(72) Inventors: Meng-Ying Zhang, Shanghai (CN); Yang Li, Shanghai (CN); Ting Zhou, Shanghai (CN); Yang Yang, Shanghai (CN); Honglin Hu, Shanghai (CN); Haifeng Wang, Shanghai (CN)

(73) Assignee: SHANGHAI RESEARCH CENTER FOR WIRELESS COMMUNICATIONS, Shanghai (CN)

( * ) Notice: Subject to any disclaimer, the term of this patent is extended or adjusted under 35 U.S.C. 154(b) by 147 days.

(21) Appl. No.: 15/368,238

(22) Filed: Dec. 2, 2016

(65) Prior Publication Data

US 2017/0164402 A1 Jun. 8, 2017

(30) Foreign Application Priority Data

Dec. 4, 2015 (CN) .......................... 2015 1 0888049

(51) Int. Cl.
*H04W 74/02* (2009.01)
*H04W 76/28* (2018.01)
*H04W 72/12* (2009.01)
*H04W 16/14* (2009.01)
*H04W 74/00* (2009.01)
(Continued)

(52) U.S. Cl.
CPC ........... *H04W 74/02* (2013.01); *H04W 16/14* (2013.01); *H04W 72/1231* (2013.01); *H04W 74/002* (2013.01); *H04W 76/28* (2018.02); *H04W 74/0808* (2013.01); *H04W 84/042* (2013.01);
(Continued)

(58) Field of Classification Search
None
See application file for complete search history.

(56) References Cited

U.S. PATENT DOCUMENTS

| 2011/0142019 A1* | 6/2011 | Bharghavan ......... H04W 8/087 370/338 |
| 2012/0243440 A1* | 9/2012 | Zhang .................... H04B 7/024 370/255 |

(Continued)

*Primary Examiner* — Noel R Beharry
*Assistant Examiner* — Ruihua Zhang
(74) *Attorney, Agent, or Firm* — Wpat, PC (57) ABSTRACT

A coordination method between access points using unlicensed frequency bands and a network control node using this method are disclosed. The method includes: the first access points adjusting transmission parameters thereof to increase channel access probability of the first access points; and the second access points adjusting transmission parameters thereof to decrease the channel access probability of the second access points; wherein the degree to which channel access probability of the third access points is decreased due to adjustment of the transmission parameters of all the first access points is equivalent to the degree to which the channel access probability is increased due to adjustment of the transmission parameters of all the second access points. Through coordination between multiple access points in the same network, fair coexistence with other networks using unlicensed frequency bands can be ensured while user QoS is improved.

14 Claims, 5 Drawing Sheets

(51) Int. Cl.
 *H04W 84/04* (2009.01)
 *H04W 84/12* (2009.01)
 *H04W 88/02* (2009.01)
 *H04W 88/08* (2009.01)
 *H04W 74/08* (2009.01)
 *H04W 88/10* (2009.01)

(52) U.S. Cl.
 CPC ............ *H04W 84/12* (2013.01); *H04W 88/02* (2013.01); *H04W 88/08* (2013.01); *H04W 88/10* (2013.01)

(56) References Cited

U.S. PATENT DOCUMENTS

| | | | |
|---|---|---|---|
| 2015/0085686 A1* | 3/2015 | Chande | H04W 72/1231 370/252 |
| 2016/0095110 A1* | 3/2016 | Li | H04W 72/1215 370/329 |
| 2018/0102816 A1* | 4/2018 | Lee | H04W 48/00 |

* cited by examiner

COORDINATION METHOD BETWEEN ACCESS POINTS USING UNLICENSED FREQUENCY BAND

BACKGROUND

Technical Field

The present invention relates to a coordination method between access points using unlicensed frequency bands, which belongs to the field of wireless communication technologies.

Related Art

In recent years, with development of wireless communication technologies and popularization of intelligent terminals, mobile user demand for data communication has increased substantially, and expensive licensed frequency bands with limited bandwidth cannot meet the user demand. In order to release the pressure on mobile networks on licensed frequency bands, it is a new idea to cope with the challenge of high data amount by using unlicensed frequency bands with relatively rich resources. In addition to WiFi systems that have been massively deployed, various mobile operators and equipment manufacturers are seeking more technologies that use unlicensed frequency bands to carry data traffic of more mobile services. For example, LTE is deployed to unlicensed frequency bands, and a LTE air interface protocol is employed on the unlicensed frequency bands for communication, that is, LTE Advanced in Unlicensed Spectrums, abbreviated as LTE-U.

Development of the new technology that uses unlicensed frequency bands is faced with many challenges, in which fair coexistence with the existing WiFi systems is a primary issue. Employing a listen-before-talk (LBT) mechanism similar to WiFi and a discontinuous Transmission (DTX) mechanism is an effective method of sharing unlicensed spectrums. Any device using unlicensed frequency bands has to first monitor whether a channel is occupied before sending data. If the channel is idle in a certain period of time (e.g., within the backoff time randomly selected from a contention window), the device can occupy the channel and start transmission, but the channel occupation time cannot exceed certain limitations. At present, much standardized work is studying the LB T mechanism and the DTX mechanism of LTE-U.

As it is necessary to send data by channel competition on the unlicensed frequency bands and the continuous transmission time cannot exceed certain limitations, how the user quality of service (QoS) is ensured is also a problem to be urgently solved. In order to improve the user QoS, access points using unlicensed frequency bands need to adjust transmission parameters, for example, the size of the contention window or transmission idle time is reduced, so as to access a channel with higher probability to send data. However, this will definitely affect fairness of channel occupation of neighbor access points using the unlicensed frequency bands.

The existing solution of fair coexistence between access points using unlicensed frequency bands is mainly directed to optimization of LBT parameters and discontinuous transmission parameters of a single access point, which does not involve jointly adjusting parameters by multiple access points in the same network. For example, in a 3GPP standard proposal, it is proposed that a LTE-U base station can change channel access priority by adjusting LBT parameters, and in order to ensure fair coexistence with other access points, a LTE-U base station using a smaller contention window needs to reduce the maximum channel occupancy time. The proposal is directed to adjustment of LBT parameters in a single LTE-U base station, but does not involve coordination between LTE-U base stations. Therefore, this LBT parameter adjustment method of a single LTE-U base station cannot ensure fair coexistence with access points of another network.

SUMMARY

A primary technical problem to be solved in the present invention is to provide a coordination method between access points using unlicensed frequency bands.

Another technical problem to be solved in the present invention is to provide a network control node using the coordination method between access points.

To achieve the foregoing invention objectives, the present invention adopts the following technical solutions:

According to a first aspect of embodiments of the present invention, a coordination method between access points using unlicensed frequency bands, the access points comprising one or more first access points and one or more second access points belonging to the same network, and one or more third access points belonging to another network, comprising: the first access points adjusting transmission parameters thereof to increase channel access probability of the first access points; and the second access points adjusting transmission parameters thereof to decrease the channel access probability of the second access points; wherein the degree to which channel access probability of the third access points is decreased due to adjustment of the transmission parameters of the first access points is equivalent to the degree to which the channel access probability of the third access points is increased due to adjustment of the transmission parameters of the second access points.

Preferably, a network control node receives a coordination request from the first access points; the network control node receives feedback information from the second access points, the second access points and the first access points being co-network adjacent access points; the network control node, based on the coordination request and the feedback information, calculates adjusted transmission parameters of the first access points and the second access points, for being used by the first access points and the second access points; and the network control node notifies the first access points and the second access points about the adjusted transmission parameters respectively.

Preferably, the second access points are co-network adjacent access points of the first access points, and the second access points and the first access points have identical or partially identical interfering neighbor nodes and are in the same network.

Preferably, the coordination request comprises transmission parameters currently used by the first access points, transmission parameters desired for adjustment and an interference situation.

Preferably, the feedback information comprises transmission parameters currently used by the second access points, an transmission parameter adjustable range and an interference situation of specified interfering neighbor nodes.

Preferably, the adjusted transmission parameters used by the second access points, notified by the network control node, do not go beyond the transmission parameter adjustable range.

Preferably, the network control node compares the transmission parameters to be adjusted by the second access points with the transmission parameter adjustable range in the feedback information, the network control node sends out a notification if the transmission parameters do not go beyond the range;

if the transmission parameters go beyond the range, the network control node sets the transmission parameters to be adjusted by the second access points as a maximum value or a minimum value in the transmission parameter adjustable range in the feedback information.

Preferably, the transmission parameters desired for adjustment are transmission parameter values after adjustment, which can meet user demands, calculated by the first access points according to a current QoS demand.

Preferably, the interference situation comprises a list of interfering neighbor nodes of the first access points, interference intensity of the interfering neighbor nodes, and busy/idle ratio of the interfering neighbor nodes.

Preferably, the network control node, after receiving the coordination request from the first access points, sends out a notification to co-network adjacent access points of the first access points.

According to a second aspect of the embodiments of the present invention, a network control node receives a coordination request from at least one first access point of a first network; the network control node receives feedback information from at least one second access point of the first network, the second access point and the first access point being co-network adjacent access points; the network control node, based on the coordination request and the feedback information, calculates adjusted transmission parameters of the first access point and the second access point, so that channel access probability of at least one third access point of a second network remains substantially unchanged after the first access point and the second access point use the adjusted transmission parameters; and the network control node notifies the first access point and the second access point about the adjusted transmission parameters respectively.

The present invention introduces a coordination mechanism between multiple access points in a first network using unlicensed frequency bands, allows first access points with higher user demands to adjust transmission parameters to improve channel access probability, and also causes other access points of the first network to properly adjust transmission parameters to reduce the channel access probability on the premise of meeting their own user loads and QoS demands, to ensure overall fairness for channel occupation of second access points using unlicensed frequency bands.

Compared with the prior art, the present invention can make a better coordination decision through coordination between multiple access points in the same network. Fair coexistence with other networks using unlicensed frequency bands is effectively ensured while the user QoS is further improved.

DETAILED DESCRIPTION

The technical contents of the present invention are further described below in detail with reference to the accompanying drawings and specific embodiments.

Figure 1:
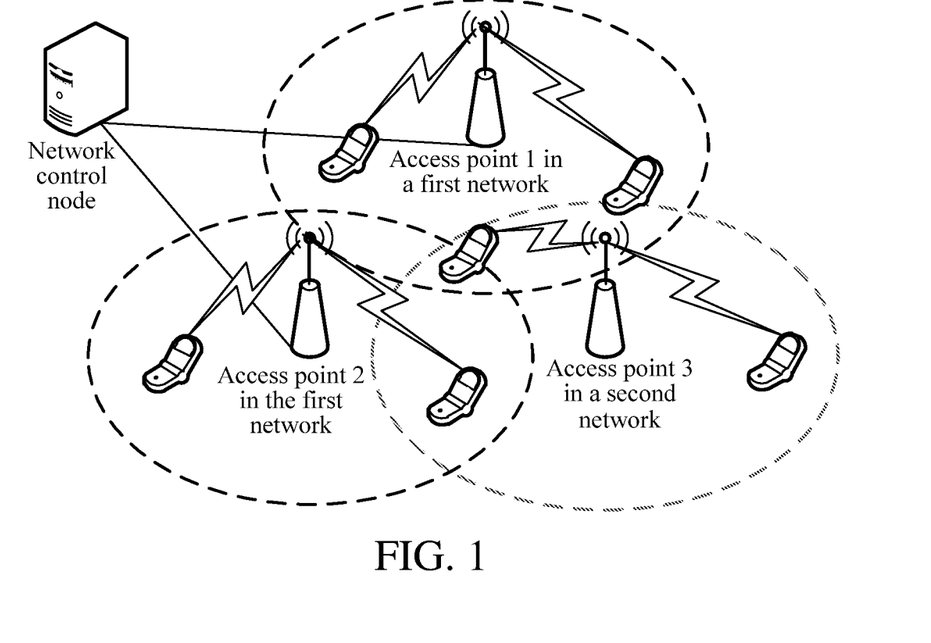
FIG. 1 is a schematic scenario diagram of multiple access points using unlicensed frequency bands.

A scenario to which the present is applied is as shown in FIG. 1. First access points and second access points using unlicensed frequency bands are deployed densely, and there are no idle channels. As shown in FIG. 1, a first network includes an access point 1 and an access point 2, and a second network includes an access point 3, all of which are access points using unlicensed frequency bands. Multiple access points in the first network may be connected to one network control node. The system has one or more mobile terminals, which respectively support only the first network or the second network.

In the present invention, after initiating a request, the first access point of the first network coordinates with the second access point adjacent thereto, to prioritize meeting the resource demand of the first access point without affecting other networks (the second network) than the first network. In other words, the first access point of the first network adjusts a transmission parameter thereof to increase channel access probability; the second access point of the first network adjusts a transmission parameter thereof to decrease the channel access probability; the degree to which channel access probability of the third access point is decreased correspondingly to adjustment of the transmission parameter of the first access point, is substantially equivalent to the degree to which the channel access probability is increased correspondingly to adjustment of the transmission parameter of the second access point.

Figure 2:
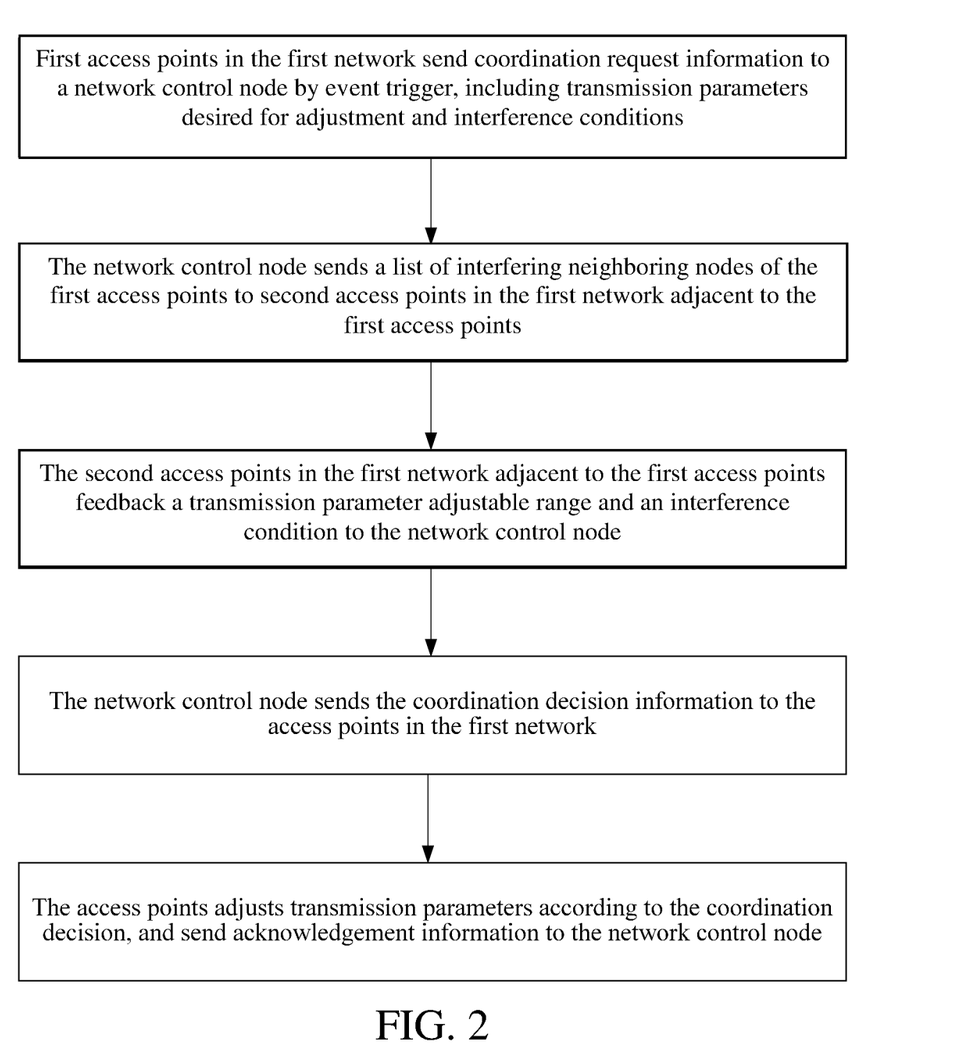
FIG. 2 is a flowchart of coordination between access points in the present invention.

As shown in FIG. 2, specific steps of the coordination method between access points using unlicensed frequency bands provided in the present invention are as follows:

Step 1: Access points in a first network send coordination request information to a network control node.

In this embodiment, the first access point sends a request to the network control node by means of event trigger. The event includes, but is not limited to, that the load of the access points exceeds a certain threshold, or the number of users having QoS demands within coverage of the access point exceeds a certain threshold, or user experience of users within coverage of the access point is lower than a certain threshold.

The coordination request information includes, but is not limited to, a transmission parameter currently used by the first access point, a transmission parameter desired for adjustment and an interference situation.

The transmission parameter includes, but is not limited to, a contention window size used by the access points, the maximum channel occupancy time, transmission idle time and channel access probability.

The transmission parameter desired for adjustment refers to a transmission parameter adjustment value, which can meet user demands, calculated by the access points according to their own current load, QoS, user experience and other information. The transmission parameter adjustment value reflects a current condition of the access point and a transmission parameter adjustment demand, and may provide a basis for the network control node to make a coordination decision.

The transmission parameter adjustment value includes which transmission parameter the access points desire to adjust, and also includes to what value the access points desire to adjust the transmission parameter. For example, the access points may, according to a current user's delay requirement, derive the channel access probability (i.e., the probability that the access points can access channel to transmit data at each timeslot) that can meet the delay requirement. The channel access probability is directly related to the contention window size of the access points (the specific conversion formula is widely used in the prior art, which is not repeated herein), and thus a desirable contention window size can be calculated from the channel access probability.

The interference situation includes, but is not limited to, a list of interfering neighbor nodes of the access points, interference intensity of the interfering neighbor nodes on the access points, and busy/idle ratio of neighbor nodes measured by the access points. The interference situation reflects a degree of correlation between the access points and the interfering neighbor nodes, indicates the extent of influences on the interfering neighbor nodes after the access points adjust transmission parameters, and can provide a basis for the network control node to make a coordination decision.

The interfering neighbor nodes include, but are not limited to, access points, mobile terminals or other devices using the same frequency bands as the first access point and interfering with the first access point.

Step 2: The network control node sends the list of interfering neighbor nodes of the first access point, to all co-network adjacent access points which are adjacent to the first access point.

The co-network adjacent access points refer to access points that are in the same network (the first network) and have identical or partially identical interfering neighbor nodes as the first access point. The network control node has beforehand obtained a list of interfering neighbor nodes of all the access points in the first network.

Step 3: The co-network adjacent access points of the first access point send feedback information to the network control node.

Herein, a second network control node is one of the co-network adjacent access points of the first access point.

After the network control node obtains feedback information of all the co-network adjacent access points, the network control node can judge the current status and the adjustable transmission parameters (parameter adjustment status) of the adjacent access points according to the feedback information. The feedback information includes, but is not limited to, transmission parameters currently used by the access points, a transmission parameter adjustable range and an interference situation with specified interfering neighbor nodes.

The transmission parameter adjustable range refers to an adjustable range of the transmission parameter which is calculated by the access points according to their own current load, QoS, user experience and other conditions. For example, on the premise of ensuring the user demand of users within coverage of the access points, the transmission parameter adjustable range can be the maximum of contention window size or transmission idle time, or the minimum of channel occupancy time or channel access probability to which the access points can be adjusted. The adjustable transmission parameter reflects a current condition of the access points and the maximum acceptable parameter adjustment range, and can provide a basis for the network control node to make a coordination decision.

The specified interfering neighbor nodes refer to interfering neighbor nodes in the list of interfering neighbor nodes of the first access point sent by the network control node.

The interference situation of specified interfering neighbor nodes includes, but is not limited to, interference intensity of the specified interfering neighbor nodes on the access points, and busy/idle ratio of the specified neighbor nodes measured by the access points. The interference situation reflects a degree of correlation between the access points and the specified interfering neighbor nodes, indicates the extent of influences on the specified interfering neighbor nodes after the access points adjust transmission parameters, and can provide a basis for the network control node to make a coordination decision.

Step 4: The network control node makes a coordination decision, and sends coordination decision information to the first access point sending the coordination request and the second access point adjacent to the first access point.

The coordination decision needs to satisfy the following conditions:

1. The influences on channel access probability of the interfering neighbor nodes after the first access point (that sends the coordination request) adjusts the transmission parameter should offset the influences on channel access probability of the interfering neighbor nodes after the co-network adjacent access points adjust the transmission parameters.

The influences on channel access probability of the access point 3 (i.e., interfering neighbor nodes) after the first access point adjusts the transmission parameter to increase the channel access probability should offset the influences on channel access probability of the access point 3 after the second access point adjusts the transmission parameter to decrease the channel access probability, so as to ensure that the channel access probability of the access point 3 before and after adjustment substantially remains unchanged. In other words, how much the channel access probability of the access point 3 decreases should offset how much the channel access probability of the access point 3 increases.

2. The transmission parameters to be adjusted by the co-network adjacent access points, which are calculated by the network control node, cannot exceed the transmission parameter adjustable range fed back.

The coordination decision information refers to transmission parameters to be adjusted by the access points, including, but not limited to, an adjustment value of the contention window size, the maximum channel occupancy time or the transmission idle time.

The network control node calculates the transmission parameters to be adjusted by the second access point and compares it with the transmission parameter adjustable range in the feedback information. If the transmission parameters to be adjusted do not go beyond the transmission parameter adjustable range, the network control node sends out a notification. If the transmission parameters to be adjusted go beyond the range, the network control node sets the transmission parameters to the maximum/minimum value in the transmission parameter adjustable range in the feedback information. Then, the network control node recalculates transmission parameter adjustment values of the first access point or other access points participating in the coordination.

That the adjustment on the transmission parameters of the co-network adjacent access points does not go beyond the transmission parameter adjustable range in the feedback information can be implemented differently by employing different algorithms, which is merely illustrated here.

How the network control node calculates transmission parameters to be adjusted by using received information from the first access point and the second access point is described below in detail.

Here is a hypothesis that the first access point sends to the network control node a currently used contention window size $CW_{11}$, a contention window size desired for adjustment $CW_{12}$ and measured interference signal intensity $I_1$ of the access point 3.

The second access point feeds back to the network control node a currently used contention window size $CW_{21}$, a maximum of adjustable contention window size $CW_{22}$ and measured interference signal intensity $I_2$ of the access point 3.

As the contention window size CW is corresponding to the channel access probability p of the access points, it is assumed that p=f (CW). It should be noted herein that, according to other transmission parameters, for example, the maximum channel occupancy time and transmission idle time, the corresponding channel access probability may also be calculated according to the formula in the prior art, and only the contention window size is used herein for illustration.

The interference signal intensity of the access point 3 measured by the first access point and the second access point, reflects a correlation degree of interference between them and the access point 3, which indicates the level of influences on the channel access probability of the access point 3 after the access points adjust the transmission parameters. The interference signal intensity can be regarded as a weight factor for adjusting the channel access probability. That is, the greater the interference signal intensity I is, the greater the influences on the channel access probability of the access point 3 after the first access point and the second access point adjust the channel access probability is.

In order to ensure overall fairness of channel occupation of the access point 3 after the first access point and the second access point adjust the transmission parameters, as a simple example, contention window sizes $CW_{13}$ and $CW_{23}$ to be adjusted respectively by the first access point and the second access point can be obtained through the following formula:

$$\frac{\Delta p_1}{\Delta p_2} = \frac{p_{13} - p_{11}}{p_{21} - p_{23}} = \frac{f(CW_{13}) - f(CW_{11})}{f(CW_{21}) - f(CW_{23})} = \frac{I_2}{I_1}$$

$$s.t. \quad CW_{23} \le CW_{22}$$

The formula indicates that the influences $\Delta p_1 \cdot I_1$ on the access point 3 causing by the first access point increasing the channel access probability $\Delta p_1$, should be substantially equal to the influences $\Delta p_2 \cdot I_2$ on the access point 3 causing by the second access point decreasing the channel access probability $\Delta p_2$. At this point, it can be considered that the influences on the access point 3 (i.e., an interfering neighbor node belonging to a network different from that of the access points 1 or 2) after the co-network adjacent access points 1 and 2 (i.e., the first access point and the second access point in the same network) adjust the transmission parameters offset. That is, before and after adjustment, the channel access probability of the access point 3 remains unchanged. Moreover, a constraint of the formula indicates that the contention window size $CW_{23}$ to be adjusted by the second access point may not be greater than the maximum of the adjustable contention window size $CW_{22}$. The contention window size $CW_{13}$ should be bigger than or very close to the contention window size desired for adjustment $CW_{12}$.

It can thus be obtained the contention window size $CW_{13}$ and $CW_{23}$ to be adjusted, which should be sent from the network control node to the first access point and the second access point.

Step 5: The first access point and the second access point adjust the transmission parameters according to the coordination decision, and send acknowledgement information to the network control node.

The sending acknowledgement information refers to sending parameter adjustment acknowledgement information to the network control node after the access points successfully adjust the transmission parameters according to the coordination decision.

Embodiment

Figure 3:
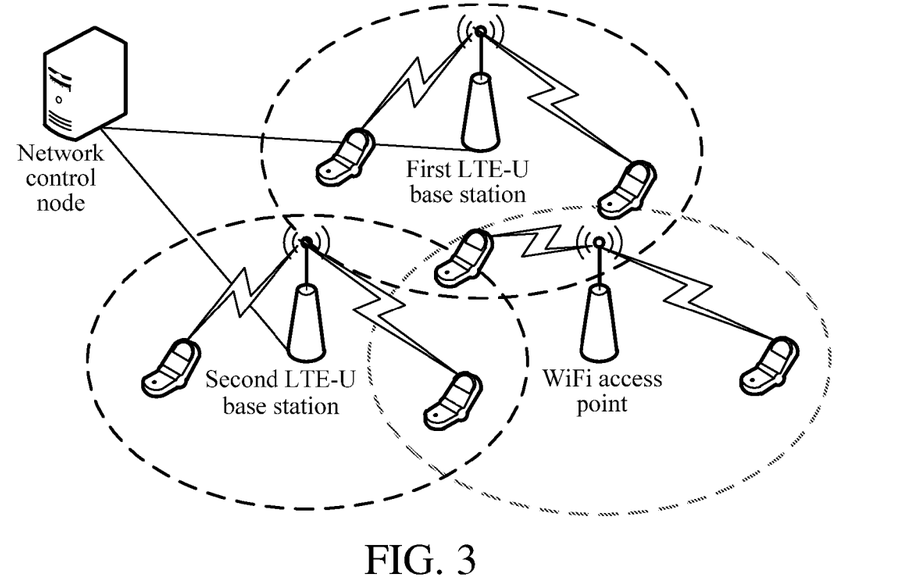
FIG. 3 is a scenario example diagram of access points in the present invention.

In this embodiment, as shown in FIG. 3, description is provided by taking that the first access point and the second access point are LTE-U base stations belonging to the same network and the third access point is a WiFi access point as an example. In other words, the third access point and the first access point are not access points deployed by the same operator, or cannot be connected to the same network control node. Similarly, the third access point and the second access point are not access points deployed by the same operator, or cannot be connected to the same network control node.

Here is a hypothesis that the LTE-U base stations and the WiFi access point are deployed densely and there is no idle channel. The LTE-U base stations can be connected to the same network control node via an X2 interface; the LTE-U base stations compete for a channel by the LBT mechanism which dynamically adjusts a contention window size. There are traditional mobile terminals that do not support LTE-U in the system; the LTE-U base stations can obtain IDs and measurement information of surrounding WiFi access points in a manner such as user reporting.

Figure 4:
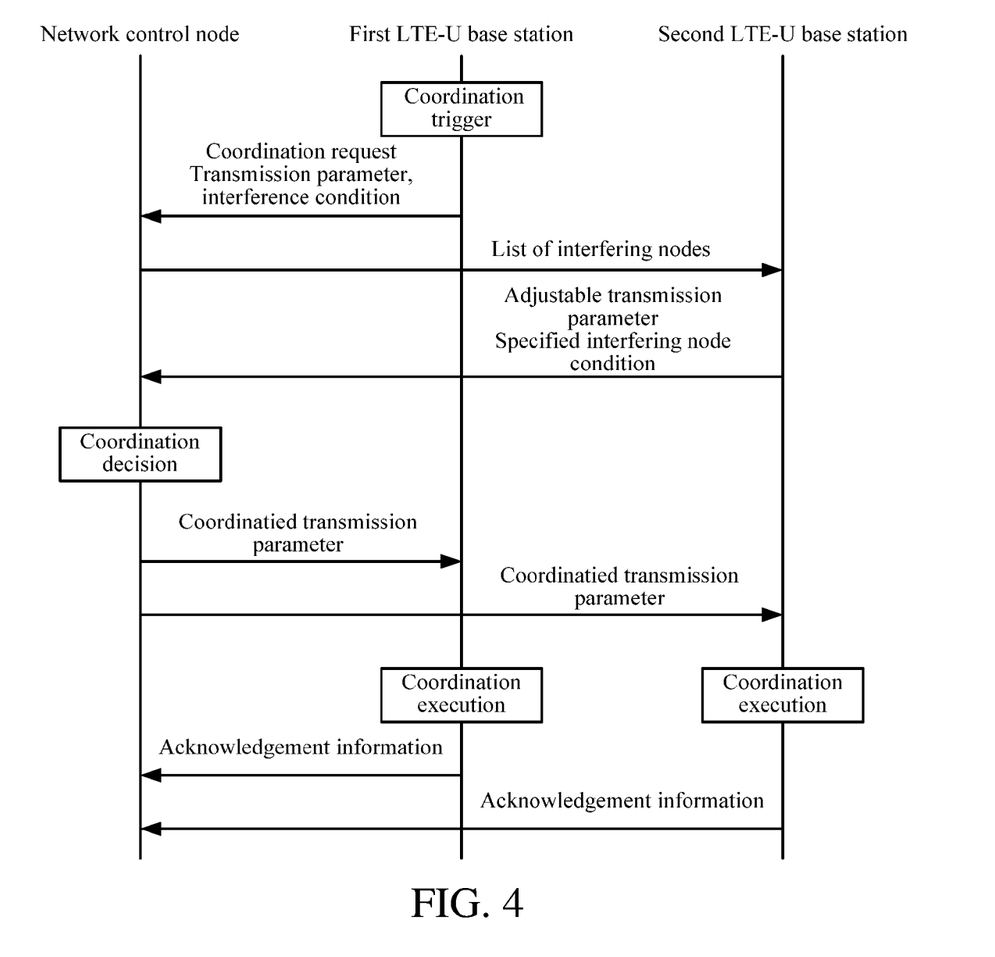
FIG. 4 is a flowchart of coordination signaling between access points in the present invention.

The signaling flow chart of this embodiment is as shown in FIG. 4, which is specifically implemented through the following steps:

Step 1: When the number of users having QoS demands within coverage of the first LTE-U base station exceeds a certain threshold, the first LTE-U base station sends a coordination request, including a transmission parameter currently used by the first LTE-U base station, a transmission parameter desired for adjustment and an interference situation.

The transmission parameter includes a contention window size, the maximum channel occupancy time and/or the transmission idle time used by the first LTE-U base station.

The transmission parameter desired for adjustment (adjustable transmission parameter) is a transmission parameter adjustment value, which can meet user demands, calculated by the first LTE-U base station according to its own current QoS demand. The transmission parameter includes a contention window size, the maximum channel occupancy time and the transmission idle time desired to be adjusted to.

The interference situation includes a list of interfering neighbor WiFi nodes of the first LTE-U base station, interference intensity of the interfering neighbor WiFi nodes on the first LTE-U base station, and busy/idle ratio of neighbor WiFi nodes measured by the first LTE-U base station. A specific format may be as shown in Table 1:

TABLE 1

| WiFi node ID | WiFi node signal intensity | WiFi node busy/idle ratio |
| --- | --- | --- |

The interference situations reflect a degree of correlation between the first LTE-U base station and the interfering neighbor WiFi nodes, which indicates the level of influences on the interfering neighbor WiFi nodes after the first LTE-U base station adjusts the transmission parameter, and can be regarded as a weight factor of adjusting the transmission parameter.

Step 2: The network control node sends the list of interfering neighbor nodes of the first LTE-U base station to a second LTE-U base station that is adjacent to the first LTE-U base station. The second LTE-U base station and the first LTE-U base station have identical or partially identical interfering neighbor nodes (e.g., WiFi access points in FIG. 3).

Step 3: The second LTE-U base station, according to its own current QoS condition, calculates and feeds back to the network control node transmission parameters currently used, transmission parameter adjustable range, and interference situations between it and specified interfering neighbor nodes (e.g., WiFi access points in FIG. 3).

The adjustable transmission parameters are the maximum contention window size or transmission idle time or the minimum channel occupancy time that the second LTE-U base station can be adjusted to on the premise that the second LTE-U base station meets user demands of the users within its coverage according to its own QoS condition.

The interference situation with the specified interfering neighbor nodes is an interference situation of interfering neighbor nodes in a list sent by the network control node measured by the second LTE-U base station. The interference situation includes interference intensity of the specified interfering neighbor nodes on the second LTE-U base station and busy/idle ratio of the specified neighbor nodes measured by the second LTE-U base station. A specific format is as shown in the following table:

TABLE 2

| WiFi node ID | WiFi node signal intensity | WiFi node busy/idle ratio |
| --- | --- | --- |

The interference situations reflect a degree of correlation between the second LTE-U base station and the specified interfering neighbor WiFi nodes. The interference situations indicates the level of influences on the specified interfering neighbor WiFi nodes after the second LTE-U base station adjusts the transmission parameter, and can be regarded as a weight factor of adjusting the transmission parameter.

Step 4: The network control node makes a coordination decision, and sends coordination decision information to the first LTE-U base station and the second LTE-U base station.

The coordination decision needs to satisfy the following conditions:

1. the influences on the specified interfering neighbor nodes after the first LTE-U base station adjusts the transmission parameter should offset the influences on the specified interfering neighbor nodes after the second LTE-U base station adjusts the transmission parameter; and 2. the transmission parameter to be adjusted by the second LTE-U base station, calculated by the network control node, cannot exceed an transmission parameter adjustable range fed back.

The coordination decision information is transmission parameters to be adjusted by the first LTE-U base station and the second LTE-U base station, including an adjustment value of contention window size, maximum channel occupancy time, and transmission idle time.

Step 5: The first LTE-U base station and the second LTE-U base station send acknowledgment information to the network control node after successfully adjusting the transmission parameters according to the coordination decision.

In the above embodiment, only two access points (the first access point and the second access point) in the first network coordinate with each other to make adjustment, to ensure that influences on an access point (the third access point) in the second network remain unchanged. However, in fact, the number of access points participating in coordination in the same network may be more than two (coordination between two access points is merely a simple embodiment). For example, the same network includes access points 1, 2, 3 and 4, the first and second access points adjust transmission parameters thereof to increase channel access probability, and the third and fourth access points adjust transmission parameters thereof to decrease the channel access probability. The total degree to which channel access probability of a fifth access point of another network is decreased due to adjustment of the transmission parameters of the first and second access points, is equivalent to the total degree to which the channel access probability is increased due to adjustment of the transmission parameters of the third and fourth access points. Alternatively, the following situation may also exist: the first access point adjusts a transmission parameter thereof to increase channel access probability, and the second, third and fourth access points adjust transmission parameters thereof to decrease the channel access probability. The total degree to which channel access probability of a fifth access point of another network is decreased due to adjustment of the transmission parameter of the first access point, is equivalent to the total degree to which the channel access probability is increased due to adjustment of the transmission parameters of the second, third and fourth access points.

Figure 5:
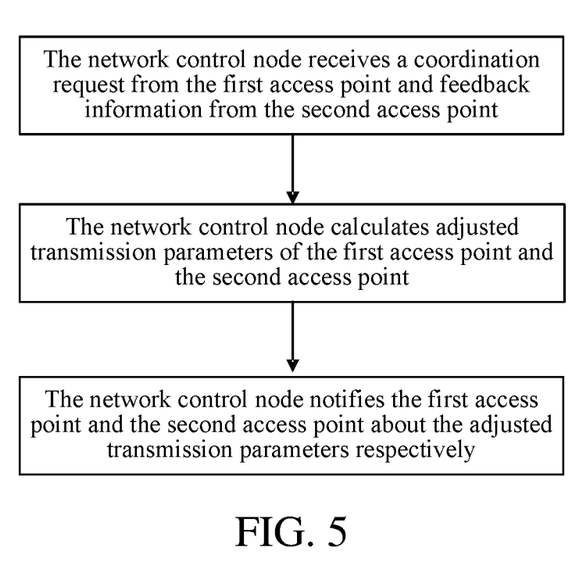
FIG. 5 is a working flowchart of a network control node in the present invention.

As shown in FIG. 5, the network control node receives a coordination request from at least one first access point of a first network, and receives feedback information from at least one second access point of the first network, wherein the second access point and the first access point are co-network adjacent access points. The network control node, based on the coordination request and the feedback information, calculates adjusted transmission parameters of the first access point and the second access point, such that the channel access probability of at least one third access point of a second network is substantially unaffected after the first access point and the second access point use the adjusted transmission parameters. Then, the network control node notifies the first access point and the second access point about the adjusted transmission parameters respectively. Herein, the channel access probability of the third access point (which may be one or more third access points) of the second network being substantially unaffected, refers to that total degree to which the channel access probability of the third access point of the second network is decreased due to adjustment on transmission parameters of all the first access points (which may be one or more first access points) is equivalent to the total degree to which it is increased due to adjustment on the transmission parameter of the second access point (which may be one or more second access points). In this way, the channel access probability of the third access point is barely (which may be zero or approximately zero, and this range value is defined by configuration of the second network) interfered by the first network.

The present invention, by coordinating transmission parameters and interference situations between multiple access points in the same network, makes access points with higher user demands increase channel access probability and other access points reduce the channel access probability correspondingly, which ensures fair coexistence while optimizing user experience.

The present invention introduces a coordination mechanism between multiple access points in a first network using unlicensed frequency bands. The mechanism allows the first access points with higher user demands to adjust transmission parameters so as to improve channel access probability, and also causes the second access points (having same or partially same neighbor access points with the first access points) to properly adjust transmission parameters to reduce the channel access probability on the premise of meeting their own user loads and QoS demands. Therefore, overall fairness for channel occupation of the first and second networks using unlicensed frequency bands is ensured. The existing solution of adjusting channel access priority only proposes that a single access point needs to reduce the maximum channel occupancy time while reducing the contention window size, to ensure fair coexistence with other access points. Compared with the prior art, the present invention can make a better coordination decision through coordination between multiple access points, which ensures fair coexistence with other networks using unlicensed frequency bands while further improving the QoS.

The above describes the coordination method between access points using unlicensed frequency bands provided in the present invention in detail. Any obvious variation made by those of ordinary skill in the art without departing from the essence and the spirit of the present invention will infringe upon the patent right of the present invention, and may bear the corresponding legal responsibility.

What is claimed is:

1. A coordination method between access points using unlicensed frequency bands, the access points comprising at least one first access point and at least one second access point belonging to a same network which including a network control node, and one or more third access point belonging to another network and cannot connect to the network control node, comprising:
   the first access point sending a coordination request to the network control node and adjusting transmission parameters thereof to increase channel access probability of the first access point which the channel access probability is the probability that the access point can access channel to transmit data at each timeslot; and
   the second access point sending a feedback information to the network control node and adjusting transmission parameters thereof to decrease the channel access probability of the second access point;
   wherein the network control node calculates influence of the first access point on the third access point using the increase or decrease of the channel access probability of the third access point according to the coordination request, and calculates influence of the second access point on the third access point using the increase or decrease of the channel access probability of the third access point according to the feedback information,
   the network control node calculates the transmission parameters of the first access point and the second access point on condition that influence of both the first and the second access point on the third access point remains unchanged,
   the control node send the transmission parameters to the first access point and the second access point,
   the first access point and the second access point adjust the transmission parameters accordingly.

2. The coordination method between access points using unlicensed frequency bands according to claim 1, wherein the network control node informs the first access point and the second access point respectively to adjust the transmission parameters.

3. The coordination method between access points using unlicensed frequency bands according to claim 1, wherein the second access point are is co-network adjacent access point of the first access point, and the co-network adjacent access point is an access point in the same network which has identical or partially identical interfering neighbor nodes.

4. The coordination method between access points using unlicensed frequency bands according to claim 1, wherein the coordination request comprises transmission parameters currently used by the first access point;
   the feedback information comprises transmission parameters currently used by the second access point;
   the network control node calculates the adjusted transmission parameters of the first access point and the second access point, based on the transmission parameters currently used by the first access point and transmission parameters currently used by the second access point.

5. The coordination method between access points using unlicensed frequency bands according to claim 4, wherein the coordination request further comprises an interference situation, which the interference situation comprises a list of interfering neighbor nodes of the first access point, interference intensity of the interfering neighbor nodes, and busy/idle ratio of the interfering neighbor nodes;
   the feedback information further comprises the interference situation of specified interfering neighbor nodes;
   the network control node calculates the adjusted transmission parameters of the first access point and the second access point, based on the interference situation in the coordination request and the interference situation of specified interfering neighbor nodes in the feedback information.

6. The coordination method between access points using unlicensed frequency bands according to claim 5, wherein the feedback information further comprises a transmission parameter adjustable range,
   the adjusted transmission parameters of the second access point do not go beyond the transmission parameter adjustable range.

7. The coordination method between access points using unlicensed frequency bands according to claim 6, wherein the network control node compares the adjusted transmission parameters by the second access point with the transmission parameter adjustable range in the feedback information,
   the network control node notifies the second access point of the adjusted transmission parameters, if the adjusted transmission parameters do not go beyond the transmission parameter adjustable range;
   the network control node sets the adjusted transmission parameters of the second access point as a maximum value or a minimum value in the transmission parameter adjustable range, if the adjusted transmission parameters goes beyond the transmission parameter adjustable range.

8. The coordination method between access points using unlicensed frequency bands according to claim 4, wherein
the coordination request further comprises transmission parameters desired for adjustment,
the transmission parameters desired for adjustment are transmission parameter values, which can meet user demands, calculated by the first access point according to a current QoS demand thereof.

9. The coordination method between access points using unlicensed frequency bands according to claim 1, wherein
the first access point measures interference signal intensity $I_1$ of the third access point,
the second access point measures interference signal intensity $I_2$ of the third access point, and
the influence $\Delta p_1 \cdot I_1$ on the third access point causing by the first access point increases the channel access probability $\Delta p1$ thereof, the influence $\Delta p_2 \cdot I_2$ on the third access point causing by the second access point decreases the channel access probability $\Delta p_2$ thereof.

10. A network control node coordinating with access points using unlicensed frequency bands, comprising:
the network control node receives a coordination request from at least one first access point of a first network;
the network control node receives feedback information from at least one second access point of the first network;
the network control node, based on the coordination request and the feedback information, calculates adjusted transmission parameters of the first access point and the second access point, wherein the network control node calculates influence of the first access point on the third access point using the increase or decrease of the channel access probability of the third access point according to the coordination request, and calculates influence of the second access point on the third access point using the increase or decrease of the channel access probability of the third access point according to the feedback information,
the network control node calculates the transmission parameters of the first access point and the second access point on condition that influence of both the first and the second access points on the third access point remains unchanged,
the network control node send the transmission parameters to the first access point and the second access point.

11. The network control node coordinating with access points using unlicensed frequency bands according to claim 10, wherein
the second access point is co-network adjacent access point of the first access point, and the co-network adjacent access point is an access point in the same network which has identical or partially identical interfering neighbor nodes,
the coordination request comprises transmission parameters currently used by the first access point;
the feedback information comprises transmission parameters currently used by the second access point;
the network control node calculates the adjusted transmission parameters of the first access point and the second access point, based on the transmission parameters currently used by the first access point and transmission parameters currently used by the second access point.

12. The network control node coordinating with access points using unlicensed frequency bands according to claim 11, wherein
the coordination request further comprises an interference situation, which the interference situation comprises a list of interfering neighbor nodes of the first access point, interference intensity of the interfering neighbor nodes, and busy/idle ratio of the interfering neighbor nodes;
the feedback information further comprises the interference situation of interfering neighbor nodes;
the network control node calculates the adjusted transmission parameters of the first access point and the second access point, based on the interference situation in the coordination request and the interference situation of specified interfering neighbor nodes in the feedback information.

13. The network control node coordinating with access points using unlicensed frequency bands according to claim 11, wherein
the feedback information further comprises a transmission parameter adjustable range,
the network control node compares the adjusted transmission parameters by the second access point with the transmission parameter adjustable range in the feedback information, the network control node notifies the second access point of the adjusted transmission parameters, if the adjusted transmission parameters do not go beyond the transmission parameter adjustable range;
the network control node sets the adjusted transmission parameters of the second access point as a maximum value or a minimum value in the transmission parameter adjustable range, if the adjusted transmission parameters goes beyond the transmission parameter adjustable range.

14. The network control node coordinating with access points using unlicensed frequency bands according to claim 11, wherein
the network control node, after receiving the coordination request from the first access point, sends out a list of interfering neighbor nodes of the first access point, to co-network adjacent access points of the first access point,
The co-network adjacent access points are access points in the first network and have identical or partially identical interfering neighbor nodes as the first access point.

* * * * *